United States Patent
Schrag et al.

(10) Patent No.: US 11,238,147 B2
(45) Date of Patent: Feb. 1, 2022

(54) METHODS AND SYSTEMS FOR VERIFYING APPLICATIONS

(71) Applicant: COMCAST CABLE COMMUNICATIONS, LLC, Philadelphia, PA (US)

(72) Inventors: Eric Schrag, Wilmington, DE (US); Saravanan Muthusamy, Wayne, PA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 123 days.

(21) Appl. No.: 16/552,488

(22) Filed: Aug. 27, 2019

(65) Prior Publication Data

US 2021/0064730 A1  Mar. 4, 2021

(51) Int. Cl.
| | | |
|---|---|---|
| H04L 29/06 | (2006.01) | |
| G06F 21/33 | (2013.01) | |
| G06F 21/51 | (2013.01) | |
| H04W 4/14 | (2009.01) | |
| H04L 29/08 | (2006.01) | |
| H04W 8/20 | (2009.01) | |
| G06F 21/60 | (2013.01) | |

(52) U.S. Cl.
CPC ............ *G06F 21/335* (2013.01); *G06F 21/51* (2013.01); *H04L 67/04* (2013.01); *H04W 4/14* (2013.01); *H04W 8/205* (2013.01)

(58) Field of Classification Search
CPC ........ G06F 21/57; G06F 21/44; G06F 21/572; G06F 2221/033; H04W 4/12; H04W 8/18; H04W 80/12

USPC .......................................................... 726/9
See application file for complete search history.

(56) References Cited

U.S. PATENT DOCUMENTS

| | | | |
|---|---|---|---|
| 7,089,552 B2 | 8/2006 | Atallah | |
| 7,530,065 B1 | 5/2009 | Ciudad | |
| 8,868,915 B2 | 10/2014 | Counterman | |
| 9,684,501 B2 | 6/2017 | Falkenburg | |
| 10,025,937 B1* | 7/2018 | Kashyap | G06Q 20/405 |
| 10,135,808 B1* | 11/2018 | Wasiq | H04L 63/102 |
| 10,498,833 B2* | 12/2019 | Schulert | H04L 65/80 |
| 10,931,675 B2* | 2/2021 | Chinnathambi | G06F 21/51 |
| 2007/0234041 A1* | 10/2007 | Lakshmeshwar | H04L 63/062 |
| | | | 713/156 |
| 2010/0058431 A1* | 3/2010 | McCorkendale | G06F 21/57 |
| | | | 726/1 |
| 2012/0036220 A1* | 2/2012 | Dare | H04L 67/04 |
| | | | 709/217 |
| 2013/0091543 A1* | 4/2013 | Wade | H04W 12/086 |
| | | | 726/1 |
| 2013/0268753 A1* | 10/2013 | Vanderpol | H04L 63/123 |
| | | | 713/155 |
| 2014/0026228 A1 | 1/2014 | Isozaki | |
| 2014/0090077 A1* | 3/2014 | Jeong | G06F 21/60 |
| | | | 726/26 |
| 2014/0274172 A1* | 9/2014 | Ludwig | H04L 51/38 |
| | | | 455/466 |

(Continued)

*Primary Examiner* — Haresh N Patel
(74) *Attorney, Agent, or Firm* — Ballard Spahr LLP

(57) ABSTRACT

An application installed on a user device (e.g., a mobile device, a smart device, a communication device, a computing device, etc.) may be used to validate, authenticate, and/or authorize another application installed on and/or associated with the user device.

20 Claims, 10 Drawing Sheets

(56) References Cited

U.S. PATENT DOCUMENTS

| | | | |
|---|---|---|---|
| 2015/0082326 A1* | 3/2015 | Milliron | G06F 11/3065 |
| | | | 719/318 |
| 2015/0230087 A1* | 8/2015 | Barkan | H04L 63/18 |
| | | | 455/411 |
| 2016/0218882 A1* | 7/2016 | Wood | H04L 9/3247 |
| 2016/0269412 A1* | 9/2016 | Farah | H04L 63/10 |
| 2017/0041309 A1* | 2/2017 | Ekambaram | G06F 21/44 |
| 2017/0208470 A1* | 7/2017 | Hu | G06F 21/56 |
| 2017/0302645 A1 | 10/2017 | Ducker | |
| 2017/0359306 A1* | 12/2017 | Thomas | H04L 63/10 |
| 2018/0089132 A1* | 3/2018 | Atta | G06F 15/7871 |
| 2018/0152440 A1* | 5/2018 | Hande | H04L 9/3213 |
| 2019/0097977 A1* | 3/2019 | Martz | H04L 63/0209 |
| 2019/0258805 A1* | 8/2019 | Elovici | G06F 21/577 |
| 2020/0007550 A1* | 1/2020 | Hede | H04L 63/0853 |
| 2020/0169560 A1* | 5/2020 | Arora | H04L 9/0891 |
| 2020/0175153 A1* | 6/2020 | Wu | G06Q 20/3672 |
| 2020/0344115 A1* | 10/2020 | Power | H04L 41/0809 |

\* cited by examiner

510 SEND A REQUEST FOR VERIFICATION

520 RECEIVE A NOTIFICATION

530 DETERMINE INFORMATION ASSOCIATED WITH THE FIRST APPLICATION

540 SEND THE INFORMATION ASSOCIATED WITH THE FIRST APPLICATION

550 RECEIVE A TOKEN THAT PERMITS THE FIRST APPLICATION TO ACCESS A RESOURCE

- 610: DETERMINE, BASED ON A REQUEST TO VERIFY A FIRST APPLICATION, A SECOND APPLICATION
- 620: RECEIVE INFORMATION ASSOCIATED WITH THE FIRST APPLICATION AND A NONCE
- 630: DETERMINE THAT THE SECOND APPLICATION SENT THE INFORMATION ASSOCIATED FROM THE FIRST APPLICATION
- 640: SEND AN INDICATION THAT PERMITS THE FIRST APPLICATION TO ACCESS A RESOURCE

- 710: RECEIVE A REQUEST FOR VERIFICATION FROM A FIRST APPLICATION INSTALLED ON A FIRST USER DEVICE
- 720: DETERMINE A SECOND APPLICATION INSTALLED ON A SECOND USER DEVICE
- 730: SEND A NOTIFICATION TO THE SECOND APPLICATION
- 740: RECEIVE INFORMATION ASSOCIATED WITH THE FIRST APPLICATION FROM THE SECOND APPLICATION
- 750: VERIFY THE FIRST APPLICATION

810 — DETERMINE, BASED ON A REQUEST TO VERIFY A FIRST APPLICATION, A SECOND APPLICATION

820 — SEND A NOTIFICATION TO THE SECOND APPLICATION

830 — RECEIVE INFORMATION ASSOCIATED WITH THE FIRST APPLICATION FROM THE SECOND APPLICATION

840 — VERIFY THE FIRST APPLICATION

850 — SEND ACCESS INFORMATION TO THE FIRST APPLICATION

METHODS AND SYSTEMS FOR VERIFYING APPLICATIONS

BACKGROUND

Computing devices, including user devices such as smart phones, tablet computers, media players, portable computers, and the like, have become ubiquitous tool for social and business communications. These user devices can run software applications, or apps, designed to help users perform specific tasks. Security and/or operation of the user device may be compromised by an unverified (e.g., invalid, unauthenticated, and/or unauthorized) application installed on the user device. Data/information and other resources available to the user device may be exploited by the invalid, unauthenticated, and/or malicious application. An unverified application may wreak havoc on the user device by enabling malicious applications and/or entities to access sensitive material and resources associated with the user device. For example, an unverified application may access user device hardware (e.g., a battery, accelerometers, global positioning hardware, a display, etc.), and/or access data/information (e.g., contact list, calendars, photos, files, etc.) stored on the user device.

SUMMARY

It is to be understood that both the following general description and the following detailed description are exemplary and explanatory only and are not restrictive. Methods and systems for verifying applications are described.

A user device (e.g., a mobile device, a smart device, a communication device, a computing device, etc.) typically has many applications installed. Some applications installed on the user device are "verified." For example, on an iPhone, an Apple® developed and installed application might be "verified." A verified application installed on the user device may be used to verify an unverified application, such as a new application, installed on the user device. In order to verify both the first and second applications, the first application may communicate with an application management device/service to provide identifying information, such as an identifier of the first application and/or a device identifier of the user device. The application management device/service may use the device identifier to determine, and communicate with, a second application (e.g., a verified application) installed on the user device. The second application may determine information associated with the first application, such as whether the first application is installed on the user device. The second application may communicate the determined information to the application management device/service to verify (e.g., validate, authenticate, and/or authorize) the first application. Existing techniques that utilize username and password combinations require user interaction to verify (e.g., validate, authenticate, and/or authorize) applications installed on a user device, and such interaction is susceptible to username and/or password cracking and/or hacking by malicious entities/software which may make sensitive data/information associated with the user device available to the malicious entities/software.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, together with the description, serve to explain the principles of the methods and systems:

FIG. 5 shows an example flowchart of a method for verifying applications;

FIG. 6 shows an example flowchart of a method for verifying applications;

FIG. 7 shows an example flowchart of a method for verifying applications;

FIG. 8 shows an example flowchart of a method for verifying applications;

DETAILED DESCRIPTION

Figure 1:
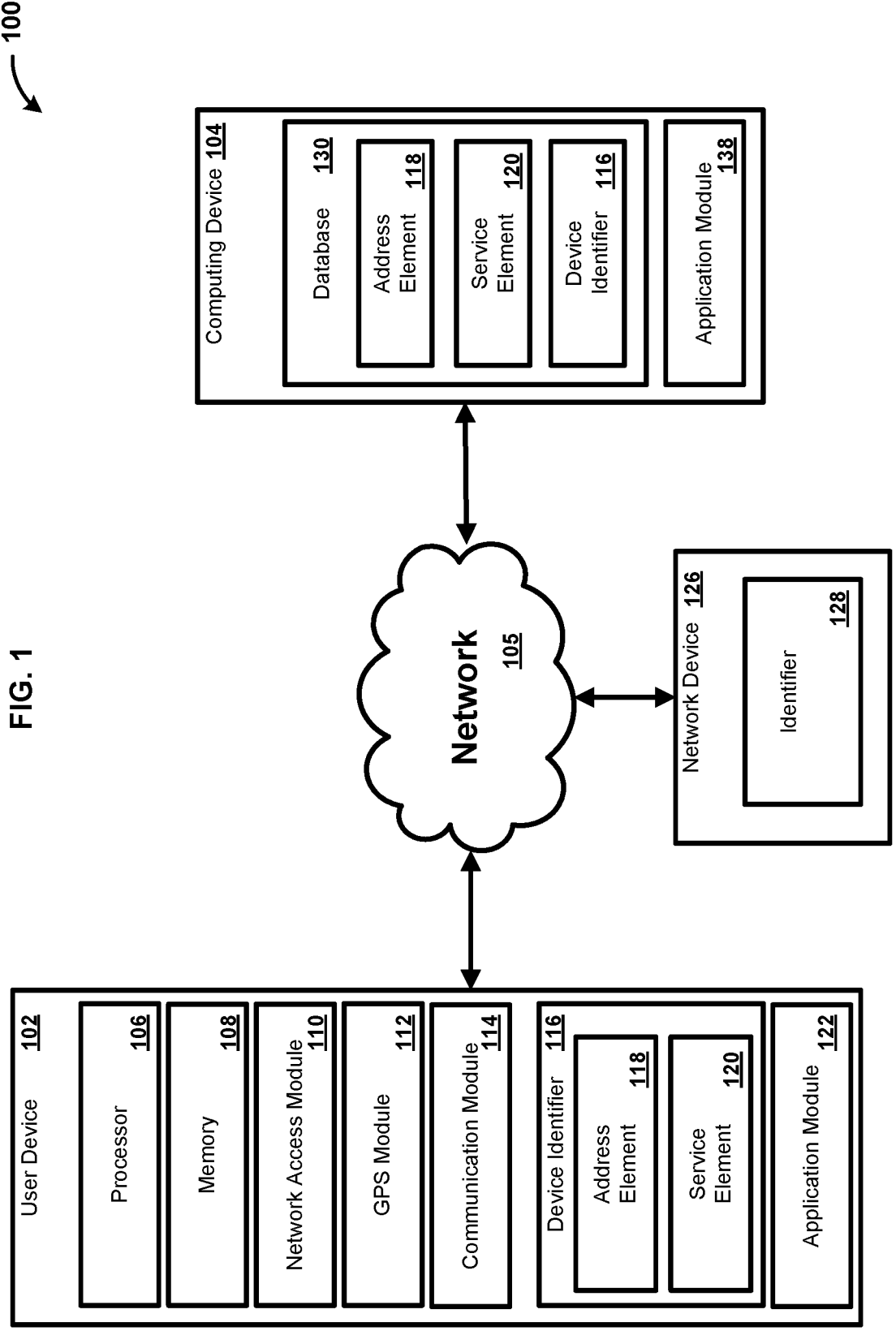
FIG. 1 shows an example system for verifying applications.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data/information processing apparatus to produce a machine, such that the processor-executable instructions which execute on the computer or other programmable data/information processing apparatus create a device for implementing the functions specified in the flowchart block or blocks.

These processor-executable instructions may also be stored in a computer-readable memory that may direct a computer or other programmable data/information processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data/information processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

This detailed description may refer to a given entity performing some action. It should be understood that this language may in some cases mean that a system (e.g., a computer) owned and/or controlled by the given entity is actually performing the action.

A user device may have a plurality of applications installed. One or more applications may be newly installed while other applications may have been previously installed. One or more applications may have already been established as verified applications, while other applications have not. As used herein, "verified," "unverified," or "verification" may refer to whether an application has been authenticated, authorized, and/or validated as being legitimate, trustworthy, and/or non-malicious. Authenticated, authorized, and/or validated applications may include applications with an identity that has been confirmed. Authenticated, authorized, and/or validated applications may include applications that are permitted to be installed or otherwise used. Authenticated, authorized, and/or validated applications may include applications that have been confirmed to be operable on the device in which the application is installed.

As a security measure, a verified application installed on the user device may be used to verify an unverified application, such as a new application, installed on the user device or installed on another user device. To verify a first application (e.g., a newly installed application, an unknown application, etc.), the first application may communicate with an application management device/service (e.g., a server, a cloud device, a service provider, etc.). In some instances, the first application may communicate with an application management device/service in order to provide identifying information (e.g., an identifier, an application identifier, etc.). The identifying information may comprise, for example, one or more of an identifier (e.g., an instance identifier (IID), an application package identifier, etc.) of the first application that may be used to verify the first application (e.g., verify an application package name, track the first application, etc.), determine authenticity of the first application (e.g., determine if the first application has a valid installation signature, etc.), determine if the first application is active on the user device (e.g., determine when the first application was installed on the user device, etc.), generate/determine one or more security tokens associated with the first application, and/or any other associated security/verification information. The identifying information may include an identifier of the user device (e.g., a device identifier), such as a mobile directory number (MDN), a mobile identification number (MIN), an international mobile subscriber identity (IMSI), an international mobile equipment identifier (IMEI), and/or any other identifier associated with the user device. The application management device/service may communicate with, a second application. For example, the application management device/service may communicate with, a second application installed on the user device. In some instances, the application management device/service may use the device identifier to determine, and communicate with, a second application (e.g., a verified application, etc.) installed on the user device. In some instances, the application management device/service may receive identifying information from a user device, and use a device identifier of the user device to determine and communicate with a second application (e.g., a verified application) installed on another user device.

The application management device/service may use the identifier of the first application to determine whether the first application is legitimate, trustworthy, and/or non-malicious. The application management device/service may use the identifier of the first application to determine whether the first application is associated with a whitelist, such as whether the first application is an application considered to be legitimate, trustworthy, and/or non-malicious. If the first application is associated with the whitelist, the application management device/service may use the device identifier to determine/identify the second application as being installed on the user device (or on another authorized user device). The application management device/service may use the device identifier to communicate with the second application. The application management device/service may send a notification (e.g., a short message service (SMS) message, a push notification such as a wireless access protocol (WAP) push, a binary SMS message, an enhanced message service (EMS) message, etc.) to the second application that causes the second application to determine information associated with the first application, such as whether the first application is indeed installed on the user device and the like. The second application may send the information associated with the first application to the application management device/service. The application management device/service may, based on the information received from the second application, verify (e.g., validate, authenticate, and/or authorize) the first application.

FIG. 1 shows a system 100 for verifying applications. One skilled in the art will appreciate that provided herein is a functional description and that the respective functions may be performed by software, hardware, or a combination of software and hardware. The system 100 may include a network 105. The network 105 may be a private and/or public network, such as the Internet, a local area network, a wide area network, a cellular network, a satellite network, combinations thereof, and/or the like. The network 105 may include and/or support any form of wired and/or wireless communication.

The system 100 may include one or more network devices 126. The one or more network device(s) 126 may facilitate the connection of a device, such as a user device 102, to the network 105. The one or more network device(s) 126 may be part of a cellular network. The one or more network device(s) 126 may be and/or include a wireless access point (WAP). The network device(s) 126 may allow one or more wireless devices to connect to a wired and/or wireless network using Wi-Fi, Bluetooth or any desired method or standard. The network device(s) 126 may be and/or include a dual band wireless access point. The network device(s) 126 may be configured with a first service set identifier (SSID) (e.g., associated with a user network or private network) to function as a local network for a particular user or users. The network device(s) 126 may be configured with a second service set identifier (SSID) (e.g., associated with a public/community network or a hidden network) to function as a secondary network or redundant network for connected communication devices.

The network device(s) 126 may include an identifier 128. One or more identifiers (e.g., the identifier 128, etc.) may be or relate to an Internet Protocol (IP) Address IPV4/IPV6 or a media access control address (MAC address) or the like. The identifier 128 may be a unique identifier for facilitating communications on a physical network. The network device(s) 126 may include a distinct identifier 128 that is associated with a physical location of the network device(s) 126.

The system 100 may include the user device 102 in communication with a computing device 104. The user device 102 may be in communication with the computing device 104 via a long-range communication technique (e.g., Internet, cellular, satellite, and the like), via a short-range communication technique (e.g., BLUETOOTH®, ZigBee, Z-wave, near-field communication, infrared, etc.), and/or via any communication technique. The user device 102 may be a mobile device, a smart device, a communication device, a laptop, a tablet, a computing device, and/or the like. The computing device 104 may be an application management device/service. The computing device 104 may be disposed locally or remotely relative to the user device 102. The user device 102 and the computing device 104 can be in communication via the network 105. In some instances, the system 100 may include multiple user devices (e.g., the user device 102, etc.) and/or computing devices (e.g., the computing device 104, etc.) in communication via the network 105.

The user device 102 can comprise a processor 106. The processor 106 may be and/or include any suitable microprocessor or microcontroller, such as a low-power application-specific controller (ASIC) and/or a field programmable gate array (FPGA) designed or programmed specifically for the task of controlling the user device 102 as described herein, or a general purpose central processing unit (CPU) (e.g., a CPU based on 80x86 architecture as designed by Intel™ or AMD™, or a system-on-a-chip as designed by ARM™. The processor 106 can be coupled to auxiliary devices or modules of the user device 102 via a bus or other coupling.

The user device 102 include a non-transitory memory device 116 coupled to the processor 106. The memory device 116 can comprise a random access memory (RAM) configured for storing application data/information (e.g., instance IDs, application package identifiers, an MDN, an MIN, an IMSI, an IMEI, etc.), program instructions and data/information for execution and/or processing by the processor 106 during control of the user device 102. When the user device 102 is powered off and/or in an inactive state, application data/information, program instructions and other data/information may be stored in a long-term memory, such as a non-volatile magnetic optical, an electronic memory storage device (not shown), and/or the like. The RAM and/or the long-term memory may store and/or include one or more application programming interfaces (APIs) associated with one or more applications associated with and/or installed on the user device 102. The RAM and/or the long-term memory may include a non-transitory computer-readable medium storing program instructions that, when executed by the processor 106, cause the user device 102 to perform all or part of one or more methods and/or operations described herein. Program instructions and/or the like may be written in any suitable high-level language, such as C, C++, C#, Java™, and/or the like. Program instructions and/or the like may be compiled to produce machine-language code for execution by the processor 106.

The user device 102 can include a network access module 110. The network access module 110 may enable the user device 102 to be coupled to and/or in communication with one or more ancillary devices such as via a network device(s) 126 (e.g., a access point, etc.) associated with a wireless telephone network, local area network, service provider, the Internet, and/or the like. The user device 102 (processor 106) may share data/information with the one or more ancillary devices via the network access module 110. The shared data/information can comprise application data/information, call data/information, messaging data/information, usage data/information, location data/information, operational data/information associated with the user device 102, a status of the user device 102, a status and/or operating condition of one or more the components of the user device 102, text to be used in a message, and/or any other data. The user device 102 may be configured to receive control instructions from the one or more ancillary devices via the network access module 110. A configuration of the user device 102, an operation of the user device 102, and/or any other settings of the user device 102, may be controlled by the one or more ancillary devices, such as another user device 102 and/or the computing device 104, via the network access module 110.

The user device 102 may comprise a global positioning system (GPS) module 112. The GPS module 112 may determine/detect a current location of the user device 102, such as determine/detect that the user device 102 is within and/or in communication with a local area network that is associated with the user device 102 and/or a user profile or a user associated with the user device 102. A user can request access to one or more services that rely on a current location of the user and/or user device 102, such as verification of one or more applications installed on and/or associated with the user device 102 and/or a device associated with the user device 102 (e.g., another user device 102, etc.). The user device 102 (processor 106) may receive location data/information from the GPS module 112, convert it to usable data/information, and send/transmit the usable data/information to the one or more services via the network access module 110. The GPS module 112 may receive position information from a constellation of satellites operated by the U.S. Department of Defense. Alternately, the GPS module 112 may be a GLONASS receiver operated by the Russian Federation Ministry of Defense, or any other positioning device capable of providing accurate location information (e.g., LORAN, inertial navigation, etc.). The GPS module 112 may include additional logic (e.g., software, hardware, etc.) to receive Wide Area Augmentation System (WAAS) signals, operated by the Federal Aviation Administration, to correct dithering errors and provide highly accurate (e.g., within a range of two meters, etc.) location data/information.

The user device 102 may include a communication module 114. The communication module 114 may provide an interface to a user to interact with the user device 102 (or another user device 102) and/or the computing device 104. The communication element 114 can be any interface for presenting and/or receiving information to/from the user, such as a notification that an application installed on and/or associated with the user device 102 (or another user device 102) is a verified application, or a notification that an application installed on and/or associated with the user device 102 (or another user device 102) is an unverified application. The communication element 114 may include and/or be associated with a communication interface such as a web browser (e.g., Internet Explorer, Mozilla Firefox, Google Chrome, Safari, or the like). Other software, hardware, and/or interfaces can be used to provide communication between the user and one or more of the user device 102 (or another user device 102) and the computing device 104. The communication element 114 can request or query various files from a local source and/or a remote source, such as one or more one or more application programming interfaces (APIs) associated with one or more applications associated with and/or installed on the user device 102. The communication element 114, via the network access module 110 and/or the like, may send/transmit data/information to and/or receive data/information from a local or remote device such as the computing device 104 (e.g., an application management device/service, etc.) and/or another user device 102.

The user device 102 may be associated with a user identifier or device identifier 116. The device identifier 116 may be and/or include an MDN, an MIN, an IMSI, an IMEI, and/or the like. The device identifier 116 may be and/or include any identifier, token, character, string, and/or the like, for differentiating one user or user device (e.g., user device 102) from another user or user device. The device identifier 116 may identify a user or user device as belonging to a particular class of users or user devices. The device identifier 116 may comprise information relating to the user device 102 such as a manufacturer, a model or type of device, a service provider associated with the user device 102, a state of the user device 102, a locator, and/or a label or classifier. The device identifier 116 may comprise and/or be associated with information relating one or more applications installed on and/or associated with the user device 102. Other and/or any information may be represented by the device identifier 116.

The device identifier 116 may comprise an address element 118 and a service element 120. The address element 118 may include or provide an MDN, an internet protocol address, a network address, a media access control (MAC) address, an Internet address, and/or the like. The address element 118 may be relied upon to establish a communication session between the user device 102 and the computing device 104 or other devices and/or networks. The address element 118 may be used as an identifier or locator of the user device 102. The address element 110 may be persistent for a particular network.

The service element 120 may comprise an identification of a service provider associated with the user device 102 and/or with the class of user device 102. The class of the user device 102 may be related to a type of device, capability of device, type of service being provided, and/or a level of service (e.g., business class, service tier, service package, etc.). The service element 120 may comprise information relating to or provided by a communication service provider (e.g., an application service provider, an Internet service provider) that is providing or enabling data/information flow such as application (e.g., a software application, etc.) and/or communication services to the user device 102. The service element 120 may comprise information relating to a preferred service provider for one or more particular services relating to the user device 102. The address element 118 may be used to identify or retrieve data/information from the service element 120, or vice versa. The address element 118 and the service element 120 may be stored remotely from the user device 102 and retrieved by one or more devices such as the user device 102 and/or the computing device 104. Other information may be represented by the service element 112.

The user device 102 may include an application module 122. The application module 122 may include and/or be associated with one or more applications installed on and/or associated with the user device 102. The application module 122 may comprise a package manager, configured for installing, uninstalling, and/or updating applications. The application module 122 may be queried to obtain a list of applications installed on the user device 102. The application module 122 may be queried to obtain a list of applications that are currently running on the user device 102. The application module 122 may include one or more application programming interfaces (APIs) associated with the one or more applications installed on and/or associated with the user device 102. The application module 122 may associate one or more components of an application with media, content, and/or resources associated with the user device 102. The application module 122 may modify an operating system of the user device 102, if necessary, to allow the one or more applications to execute and/or perform properly. The application module 122 may use a verified application installed on the user device 102 to verify an unverified application installed on, or associated with, the user device 102, such as a new application installed on the user device 102.

Security measures associated with the user device 102 may prevent an unverified application from gaining access to sensitive material/content (e.g., contact list, calendars, photos, files, etc.) and/or resources (e.g., a battery, accelerometers, global positioning hardware, a display, etc.) associated with the user device 102. In order to verify a first application (e.g., a newly installed application, an unknown application, etc.) installed on and/or associated with the user device 102, the user device 102 may cause the first application to communicate with the computing device 104.

The computing device 104 may be an application management device/service configured for communicating with the user device 102. The computing device 104 may communicate with the user device 102 to provide data/information and/or services, such as application management services. The computing device 104 may also provide services such as network (e.g., Internet) connectivity, network printing, media management (e.g., media server), content services, streaming services, broadband services, or other network-related services. The computing device 104 may allow the user device 102 to interact with remote resources such as data, devices, files, applications, and/or the like. The computing device 104 may be configured as (or disposed at) a central location (e.g., a headend, or processing facility).

The computing device 104 may manage the communication between the user device 102 and a database 130 for sending and receiving data/information therebetween. The database 130 may store a plurality of files (e.g., application whitelist, web pages, etc.), user identifiers or records (e.g., user profiles, user accounts, device profiles, etc.), tokens (e.g., authentication tokens, authorization tokens, instance ID tokens, etc.), and/or any other information. The user device 102 (e.g., an application installed on and/or associated with the user device 102, etc.) may request and/or retrieve a file from the database 130. The database 130 may store information relating to the user device 102 such as an application whitelist, any data/information associated with one or more applications installed on and/or associated with the user device 102, and the like. The database 130 may store the address element 118 and/or the service element 120. The computing device 104 may obtain the device identifier 116 from the user device 102 and retrieve information from the database 130 such as, data/information associated with an application installed on and/or associated with the user device 102, the address element 118 and/or the service element 120. The computing device 104 may obtain the address element 118 from the user device 102 and may retrieve the service element 120 from the database 130, or vice versa. Any information may be stored in and retrieved from the database 130. The database 130 may be disposed remotely from the computing device 104 and accessed via direct or indirect connection/communication. The database 130 may be integrated with the computing device 104 or some other device or system.

The computing device 104 may include an application module 138. The application module 138 may use an application installed on a user device 102 and/or a device associated with the user device 102 to determine another application installed on a user device 102 and/or a device associated with the user device 102. For example, the first application installed on the user device 102 may communicate with the application module 138 to provide an identifier of the first application, such as an instance ID, an application package identifier, and/or the like. The first application may also provide the application module 138 an identifier of the user device 102, such as the device identifier 116, an MDN, an MIN, an IMSI, an IMEI, and/or any other identifier associated with the user device 102. The computing device 104 may use the device identifier 116 to determine and communicate with a second application (e.g., a verified application) installed on the user device 102. In some instances, the computing device 104 may use device identifier 116 associated with a user device 102 to determine and/or communicate with a second application (e.g., a verified application) installed on another user device that is associated with the user device 102.

The application module 138 may use the identifier of the first application to determine whether the first application is associated with a whitelist. The whitelist may indicate whether the first application is an application that is deemed/considered to be acceptable and/or trustworthy. The whitelist may be and/or be associated with a user account, a user profile, and/or the like that is created (e.g., created when the user device 102 is purchased, updated, initiated, etc.), updated, and/or otherwise maintained by a service provider (e.g., via the computing device 104) and/or the like. If the application module 138 is unable to match the first application to an application on the whitelist, the first application may be deemed/considered an unverified application, and the application module 138 may send a signal to the user device 102 that causes the first application to uninstall and/or be restricted from accessing data/information associated with the user device 102. If the application module 138 is able to determine the first application is on the whitelist (or verify that the first application is deemed to be acceptable/trustworthy by any other method), the application module 138 may use the identifier of the user device 102 to determine/identify a second application installed on and/or associated with the user device 102. In some instances, if the application module 138 is able to determine the first application is on the whitelist (or verify that the first application is deemed to be acceptable/trustworthy by any other method), the application module 138 may determine/identify another user device (e.g., another user device 102) associated with the user device 102. In some instances, the application module 138 may use the identifier of the user device 102 to determine/identify another user device (e.g., an identifier of another user device) associated with the user device 102 and a second application installed on and/or associated with the other user device 102. For example, a user may have more than one user device, such as a mobile phone and a tablet. In another example, multiple devices may be associated with a group of users (e.g., a family, coworkers, etc.).

The computing device 104 may communicate with the second application. In some instances, the computing device 104 may use the identifier of the user device 102 to communicate with the second application. By way of example, the identifier of the user device 102 may be an MDN. The computing device 104 (the application module 138) may use the MDN to send a notification to the second application. The notification may include a nonce. The notification may be, for example, a SMS message, a push notification such as a WAP push, a binary SMS message, an EMS message, and the like. The notification may cause and/or instruct the second application to determine information (e.g., a security parameter) associated with the first application. The information associated with the first application may comprise one or more of, an installation status of the first application, an operational status of the first application, an application programming interface (API) associated with the first application, an identifier (an application package name) of the first application, installation signature, creation/installation date/time, combinations thereof, and the like.

An application may be used to determine whether another application is installed on the user device 102. The second application may determine whether the first application is installed on the user device 102. For example the notification may cause the second application to determine whether the first application is indeed installed on the user device 102. For instance, the second application may cause one or more of the processor 106, the memory 108, or any other component of the user device 102 to query the application manager 122 to determine if the first application is installed and/or is currently running on the user device 102. In another example, the notification may cause the second application to query the application manager 122 to determine if the first application is on a whitelist, has a valid installation signature, determine a creation/installation instance (e.g., an installation time, an installation date, etc.) of the first application, and/or the like. In another example, the second application may determine if an application programing interface (API) associated with the first application is available on the user device 102. The second application may determine an application package name of the first application and, in some instances, determine whether the application package name matches a whitelisted application package name. In another example, the notification may cause the second application to execute an object, such as ContentResolver on the Android operating system, to obtain a Uniform Resource Identifier (URI) associated with the first application and parse the URI to determine information associated with the first application. In some instances, the first application may be associated with a user device 102, and the second application may be associated with another user device 102. The notification may cause and/or instruct the second application to establish communication between the user devices and determine information associated with the first application.

The second application may be unable to determine information associated with the first application. If so, the second application may communicate with the computing device 104. For example, if the second application is unable to determine information associated with the first application, the second application may send a notification to the computing device 104. In another example, if the second application is unable to determine information associated with the first application, the second application may send a signal to the computing device 104. The computing device 104 may send a signal to the user device 102 that causes the first application to uninstall and/or be restricted from accessing data/information associated with the user device 102. If the second application is able to determine information associated with the first application, the second application may send the information associated with the first application, an identifier of the second application, (e.g., an instance ID, an application package identifier, etc.) and a hash of the nonce and another piece of information (e.g., a hash of the nonce and the identifier of the first application, a hash of the nonce and the identifier of the second application, a hash of the nonce and the identifier of the user device, combinations thereof, and the like) to the computing device 104. The computing device 104 may generate a hash using the nonce and the same piece of information used by the second application to generate the received hash. Provided the hashes match, the computing device 104 may determine that the received information associated with the first application originated from the user device 102.

The computing device 104, based on the information associated with the first application received via the second application, may verify the first application. The computing device 104 may generate/determine the token. The token may include credentials, the credentials may include an identifier associated with the first application (e.g., an application identifier, an application signature, a vendor identifier, etc.), information associated with user device (e.g., a device identifier, a MAC address, an MDN, an IP address, etc.), and/or information associated with the user (e.g., username, password, PIN, etc.). The computing device 104 may send/provide a token (e.g., an authentication token, an authorization token, an instance ID token, etc.) to the first application that the first application may use to access material/content (e.g., contact list, calendars, photos, files, etc.) and/or resources (e.g., a battery, accelerometers, global positioning hardware, a display, etc.) associated with the user device 102. The first application, based on receiving the token, may be deemed/considered a verified application installed on the user device 102.

Figure 2:
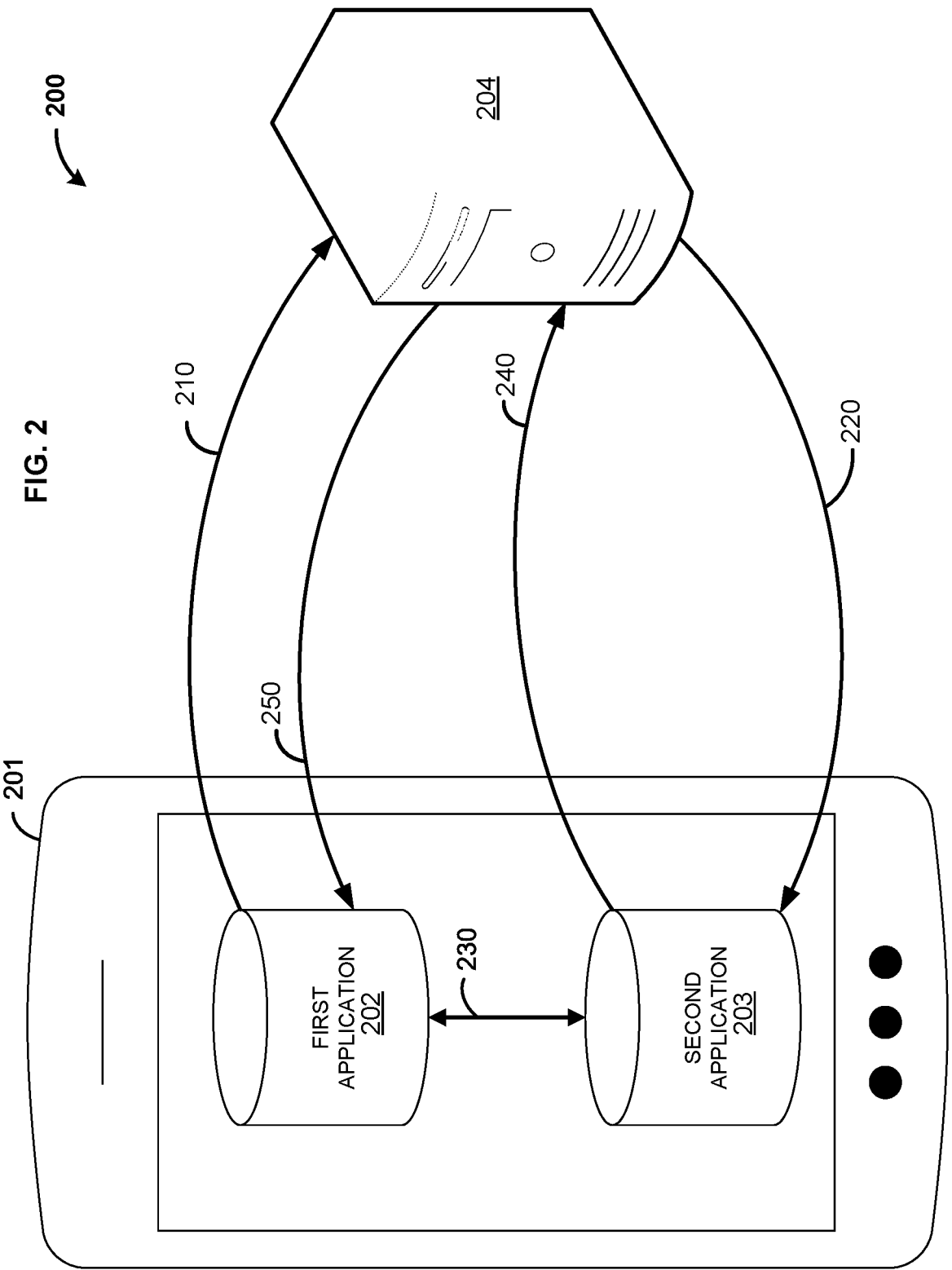
FIG. 2 shows an example system for verifying applications.

FIG. 2 shows an example system 200 for verifying applications. A user device 201 (e.g., the user device 102, etc.) may be configured with a first application 202 (e.g., a software application, a program, etc.) and a second application 203. The first application 202 may be an application newly installed, or newly updated, on the user device 201 and the second application 203 may be a previously installed application on the user device 201. The second application 203 may be a verified application installed the user device 201.

At 210, the first application 202 may begin a communication session with an application management server 204. For example, the first application may request authentication. For example, to verify the first application 202, the first application 202 may send an IID and an MDN associated with the user device 201 to the application management server 204 (e.g., the computing device 104).

The application management server 204 may determine that the MDN is associated with user information (e.g., a user account, a user profile, a service account, etc.). The user information may include a list of applications (IIDs) that are known to be installed on the user device 102. The IID of the first application may be used to determine if the first application is on, or is associated with, a whitelist (e.g., a list of acceptable and/or trustworthy applications, etc.). The whitelist may be associated with the user information (e.g., a user specific whitelist) or the whitelist may be a general whitelist (e.g., not user specific). The application management server 204 may, based on the IID of the first application, determine that the first application 202 is on the whitelist. Based on the first application 202 being on the whitelist, the application management server 204 may use the user information associated with the MDN to identify that the second application 203 is installed on the user device 102. The application management server 204 may determine an IID of the second application 203.

At 220, the application management server 204 may send a notification and/or a nonce to the second application 203. For example, the notification may be a SMS message, a push notification such as a WAP push, a binary SMS message, an EMS message, combinations thereof, and the like. The notification may comprise a nonce.

At 230, the second application may determine information. For example, the notification may cause and/or instruct the second application 203 to determine information (e.g., a security parameter) associated with the first application 202. The notification may cause the second application 203 to determine whether the first application 202 is installed on the user device 201, determine if the first application 202 has a valid installation signature, determine a creation/installation instance (e.g., an installation time, an installation date, etc.) of the first application 202, and/or the like. The second application 203 may determine the information based on querying an application package manager for the information. The second application can rely on any Operating System (OS) specific tools to determine the information. The second application may determine the information by any means.

The first application may send information, data, and/or the like. The first application may send information, data, and/or the like to the second application. At 240, based on determining the information associated with the first application 202, the second application 203 may send the information associated with the first application 202, an IID of the second application 203, and a hash of the nonce and the IID of the second application (or other information) to the application management server 204.

The application management server 204 may make a determination based on the received information. The application management server 204 may use the received information to verify an application and/or the like. For example, the application management server 204 may generate a hash using the nonce and the IID of the second application 203. The application management server 204 may compare the generated hash to the received hash. Provided the hashes match, the application management server 204 may determine that the information associated with the first application 202 originated from the second application 203. The application management server 204 may, based on the information associated with the first application 202 verify the first application 202.

The application management server 204 can determine and/or indicate information/data and/or the like associated with the user device 201 and/or an application. For example, the application management server 204 can determine and/or indicate that an application is legitimate, trustworthy, and/or non-malicious. At 250, the application management server 204 can indicate authentication. For example, the application management server 204 may send/provide a token to the first application 202 to verify the first application 202. The token may be, for example, an authentication token, an authorization token, an IID token, and the like. The first application 202 may use the token to access material/content (e.g., contact list, calendars, photos, files, etc.) and/or resources (e.g., a battery, accelerometers, global positioning hardware, a display, etc.) associated with the user device 201. The first application 202, based on receiving the token, may be considered a verified application installed on the user device 201. Accordingly, the first application 202 may be added to the user information and/or the whitelist. The first application 202 may then be used to verify newly installed applications.

Figure 3:
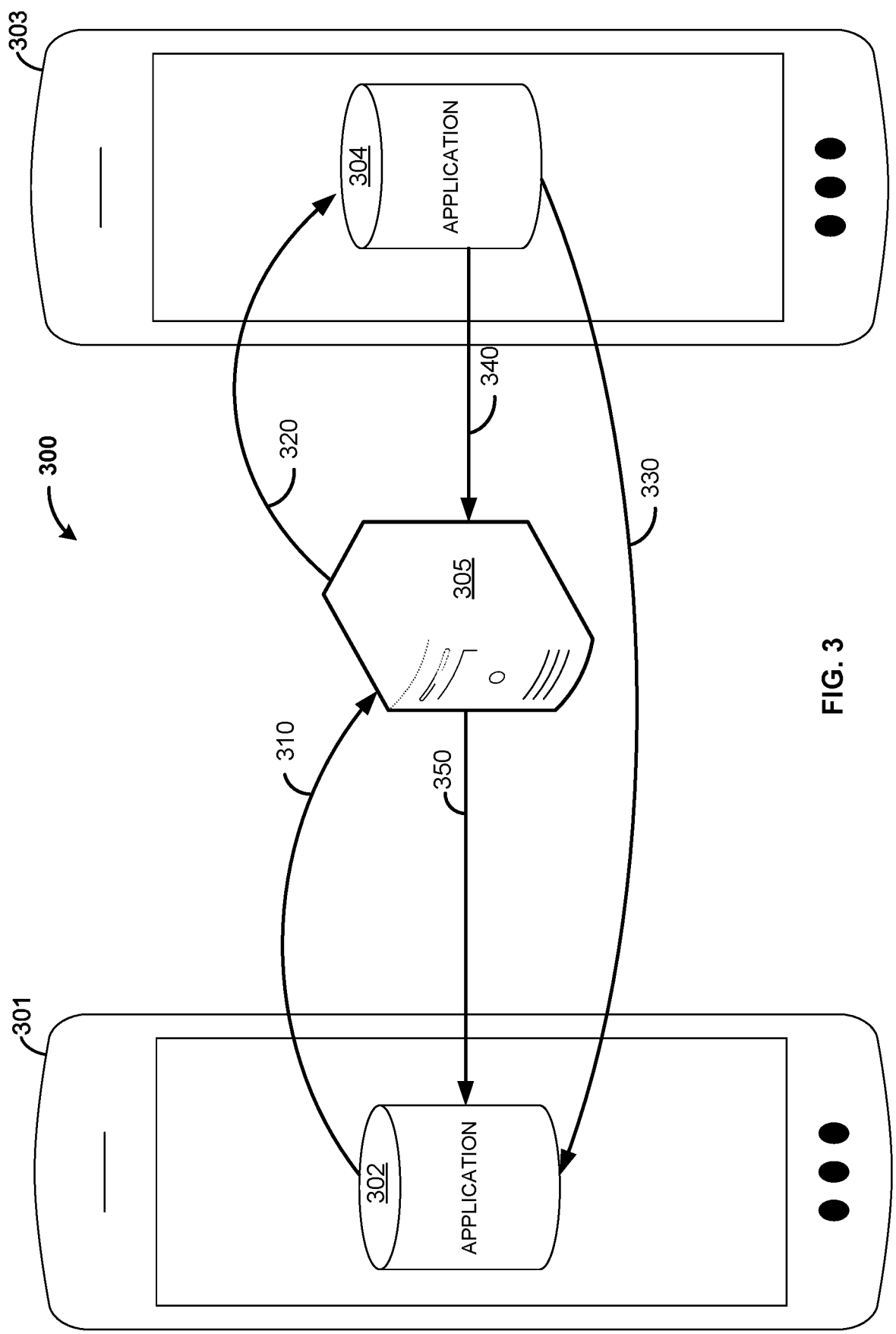
FIG. 3 shows an example system for verifying applications.

FIG. 3 shows an example system 300 for verifying applications. A user device 301 may be configured with an application 302 (e.g., a software application, a program, etc.). The application 302 may be a newly installed application on the user device 301 and therefore not yet verified. A user device 303 may be associated with the user device 301. For example, the user device 301 and the user device 303 may both be associated with the same user information (e.g., a user account, a user profile, a service account, a family account, etc.). The user information may comprise device identifiers (e.g., MDNs) of one or more devices associated with the account. The user information may also comprise application identifiers (e.g., IIDs) of applications installed on the one or more devices. The user device 303 may be configured with an application 304 (e.g., a software application, a program, etc.). The application 304 may be a verified application installed the user device 303.

At 310, the application 302 may be verified. For example, to verify the application 302, the application 302 may send an application identifier (IID) and a device identifier (MDN) associated with the user device 301 to an application management server 305 (e.g., the computing device 104). The application management server 305 may determine that the received device identifier of the user device 301 matches a device identifier in the user information and determine whether the received application identifier (BD of the first application 302) is on and/or is associated with a whitelist associated with the user information. The whitelist may be, for example, a list of application identifiers of acceptable and/or trustworthy applications. The application management server 305 may use the user information to determine that the user device 303 is associated with the user device 301. For example, the application management server 305 may determine that a device identifier of the user device 303 is also contained in the user information. The device identifier of the user device 303 may be flagged or otherwise indicate that the user device 303 is configured for verification of other applications. The application management server 305 may use the user information to determine that the application 304 is installed on the user device 303. For example, the application management server 305 may determine a list of application identifiers (IIDs) associated with the device identifier of the user device 303. The applications management server 305 may determine that the application identifier of the application 304 is in the list of applications installed on the user device 303. The application management server 305 may determine that the application 302 is on the whitelist. For example, the application management server 305 may determine that the application identifier of the application 302 is on the whitelist.

At 320, the application management server 305 may send a notification. For example, based on the application 302 being on the whitelist, the application management server 305 may send a notification to the application 304 installed on the user device 303. The notification may be, for example, a SMS message, a push notification such as a WAP push, a binary SMS message, an EMS message, and the like. The notification may comprise a nonce.

At 330, the application 304 may determine information. For example, the notification may cause and/or instruct the application 304 to determine information associated with the application 302 and/or the user device 301. To determine information associated with the application 302 and/or the user device 301, the user device 303 may communicate with the user device 301 via a long-range communication technique (e.g., Internet, cellular, satellite, and the like), via a short-range communication technique (e.g., BLUETOOTH®, ZigBee, Z-wave, near-field communication, infrared, etc.), and/or via any communication technique. The notification may cause the application 304 to determine whether the application 302 is installed on the user device 301, determine if the application 302 has a valid installation signature, determine a creation/installation instance (e.g., an installation time, an installation date, etc.) of the application 302, and/or the like. For example, the application 304 may query an application package manager installed on the user device 301 to determine the information associated with the application 302. The application can rely on any Operating System (OS) specific tools to determine the information. The application may determine the information by any means. Once determined, the information associated with the application 302 may be sent, or otherwise provided, to the application 304 and/or the application manager 305. The device identifier of the user device 301 may also be sent.

At 340, the application 304 may send information. For example, if the information associated with the application 302 is received by the application 304, the application 304 may send the information associated with the application 302, an application identifier (IID) of the application 304, information associated with the application 304, a device identifier of the user device 303 and/or the user device 301, a hash of the nonce and the IID of the application 304, and/or any other information associated with the application 302, the user device 301, the application 304, and/or the user device 303 to the application management server 305.

The application management server 305 may use the IID of the application 304, the information associated with the application 304, the device identifier of the user device 303, the hash of the nonce and the IID of the application 304, and/or any other information associated with the application 302, the user device 301, the application 304, and/or the user device 303 to determine that the information associated with the application 302 was received from the application 304. For example, the application management server 305 may generate a hash using the nonce and the IID of the application 304. Provided the generated hash matches the received hash, the application management server 305 may determine that the received information associated with the first application originated from the application 304.

Once the application management server 305 has verified that the information associated with the application 302 is verified as having been sent by the application 304, the application management server 305 may generate, request, and/or retrieve a token that may be used to verify the application 302. The token may be, for example, an authentication token, an authorization token, an IID token, and the like.

At 350, the application management server 305 may send/provide information. For example, the application management server 305 may send/provide the token to the application 302. The application 302 may use the token to access material/content (e.g., contact list, calendars, photos, files, etc.) and/or resources (e.g., a battery, accelerometers, global positioning hardware, a display, etc.) associated with the user device 301. The application 302, based on receiving the token, may be deemed/considered a verified application installed on the user device 301. Accordingly, the application 302 may be added to the user information and/or the whitelist. The application 302 may then be used to verify newly installed applications on other user devices.

Figure 4:
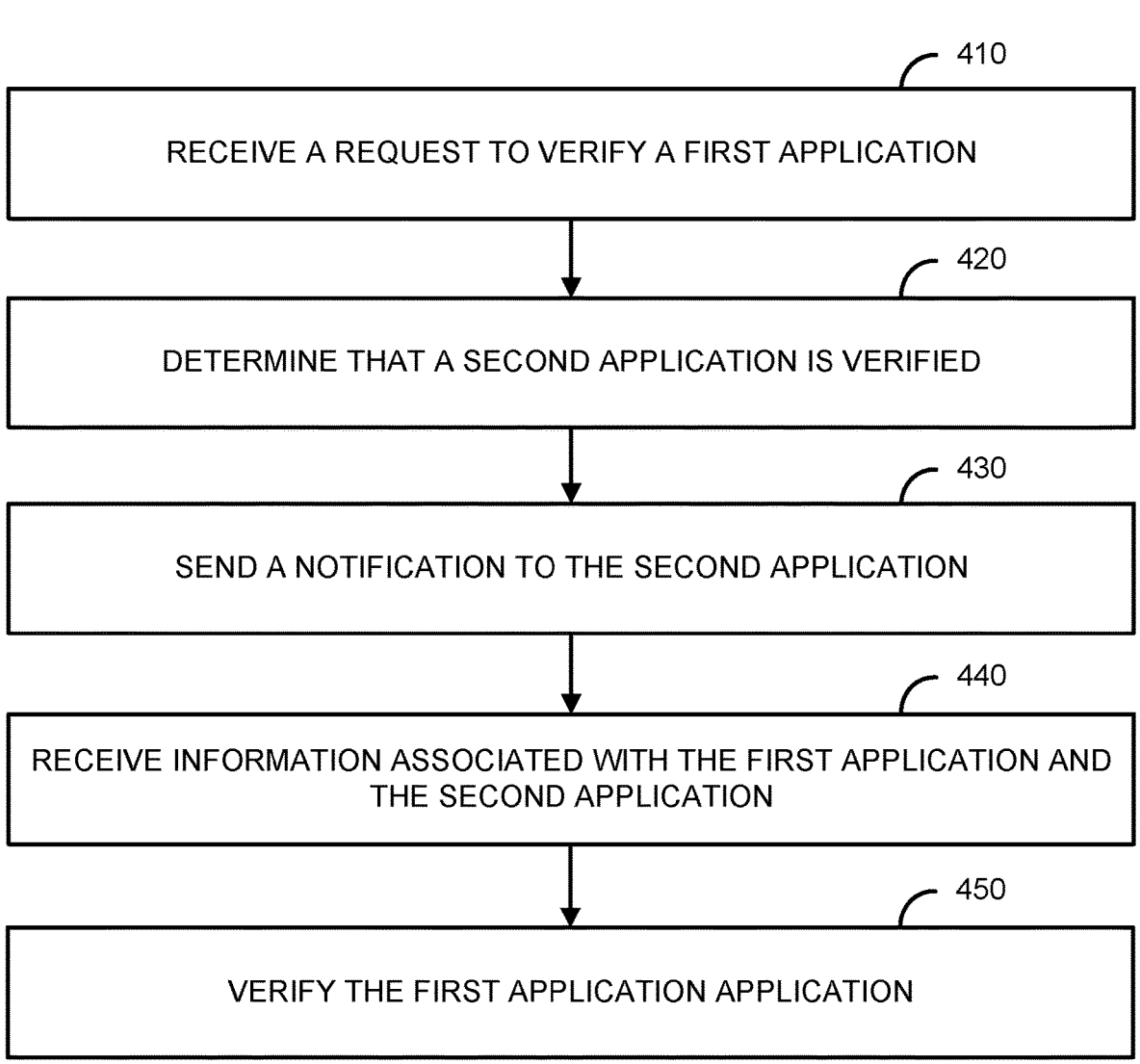
FIG. 4 shows an example flowchart of a method for verifying applications.

FIG. 4 shows a flowchart of an example method 400 for verifying applications. At 410, a request to verify an application may be received. A request can be received by any means. For example, a computing device (e.g., an application management device/service, a server, a cloud device, a service provider, the computing device 104, etc.) may receive the request for verification from a first application associated with a user device (e.g., a mobile device, a smart device, a communication device, a computing device, the user device 102, etc.). The request may include an identifier of the user device and/or an identifier of the first application. The identifier of the user device may be, for example, an MDN, an MIN, an IMSI, an IMEI, and the like. The identifier of the first application may be, for example, an IID, an application package identifier, a name of the application, and the like.

At 420, a second application associated with the user device may be determined. The second application can be determined by any means. For example, the computing device may use the identifier of the user device to determine the second application. The computing device may use the identifier of the user device to determine a user account and/or user profile associated with the user device. The computing device may use the user account and/or user profile associated to determine that the second application is installed on and/or associated with the user device. For example, an identifier of the second application may be on a list of installed applications for the user device. The second application may be a verified application installed on the user device. The second application may be indicated as being configured for verifying other applications. The computing device may determine, based on the identifier of the first application that the first application is on and/or is associated with a whitelist associated with the user account and/or user profile. The whitelist may be a list of acceptable and/or trustworthy applications.

At 430, a notification may be sent to the second application. The notification may be sent by any means. For example, the computing device may send the notification to the second application. The notification may include a push notification, a WAP push, a SMS message, a binary SMS message, an EMS message, and/or the like. The notification may cause and/or instruct the second application to determine information associated with the first application. The notification may include a nonce. The information associated with the first application may include, but is not limited to, whether the first application is installed on the user device, whether the first application has a valid installation signature, a creation/installation instance (e.g., an installation time, an installation date, etc.) of the first application, and/or any other information associated with the first application. For example, the information associated with the first application may be determined based on querying an application package manager located on the user device.

At 440, information may be received. Information may be received by any means. For example, the information associated with the first application may be received. The computing device may receive the information associated with the first application, an identifier (e.g., an IID, an application package identifier, etc.) of the second application, and/or a hash of the nonce and the identifier of the second application, from the second application.

At 450, the first application may be verified. The computing device, based on the information associated with the first application, the identifier of the second application, and/or the hash of the nonce and the identifier of the second application, may verify the first application. The computing device may determine that the information associated with the first application was received from the second application by generating a hash of the nonce and the identifier of the second application. When the generated hash matches the received hash, the computing device may verify that the information associated with the first application was received from the second application. The computing device may then request, generate, and/or retrieve a token (e.g., an authentication token, an authorization token, an IID token, etc.). The computing device may send/provide the token to the first application. The first application may use the token to access material/content (e.g., contact list, calendars, photos, files, etc.) and/or resources (e.g., a battery, accelerometers, global positioning hardware, a display, etc.) associated with the user device. The first application may be considered a verified application installed on the user device.

FIG. 5 shows a flowchart of an example method 500 for verifying applications. At 510, a request for verification may be sent. For example, a request to verify a first application may be sent via a first application. An unverified first application, such as a newly installed application, associated with a user device (e.g., a mobile device, a smart device, a communication device, a computing device, the user device 102, etc.) may send a request for verification to a computing device (e.g., an application management device/service, a server, a cloud device, a service provider, the computing device 104, etc.). The request may include an identifier of the user device and/or an identifier of the first application. The identifier of the user device may be, for example, an MDN, an MIN, an IMSI, an IMEI, and the like. The identifier of the first application may be, for example, an IID, an application package identifier, a name of the application, and the like.

At 520, a notification may be received. For example, a notification may be received via a second application. The notification may be received via a user device. A second application associated with the user device may receive a notification from the computing device. The notification may include a push notification, a WAP push, a SMS message, a binary SMS message, an EMS message, and/or the like. The notification may comprise a nonce. The computing device may use the identifier of the user device to determine a user account and/or user profile associated with the user device. The computing device may use the user account and/or user profile associated to determine that the second application is installed on and/or associated with the user device. For example, an identifier of the second application may be on a list of installed applications for the user device. The second application may be a verified application installed on the user device. The second application may be indicated as being configured for verifying other applications. The computing device may determine, based on the identifier of the first application, that the first application is on and/or is associated with a whitelist associated with the user account and/or user profile. The whitelist may be a list of acceptable and/or trustworthy applications.

At 530, information may be determined. For example, information associated with the first application may be determined via the second application. The second application may determine the information associated with the first application. The notification may cause and/or instruct the second application to determine the information associated with the first application. The information associated with the first application may include, but is not limited to, whether the first application is installed on the user device, whether the first application has a valid installation signature, a creation/installation instance (e.g., an installation time, an installation date, etc.) of the first application, and/or any other information associated with the first application. For example, the information associated with the first application may be determined based on querying an application package manager located on the user device.

At 540, information may be sent. For example, the information associated with the first application may be sent via the second application. The information associated with the first application may be sent with an identifier of the second application and/or a hash of the nonce and the identifier of the second application. The second application may send the information associated with the first application, the identifier of the second application, and/or the hash of the nonce and the identifier of the second application to the computing device. The computing device may use the identifier of the second application and/or the hash of the nonce and the identifier of the second application to determine that the information associated with the first application originated and/or was sent by the second application. The computing device may determine that the information associated with the first application was received from the second application by generating a hash of the nonce and the identifier of the second application. Providing the generated hash matches the received hash, the computing device may verify that the information associated with the first application was received from the second application.

At 550, access information may be received. The first application may receive the access information. The access information may be a token (e.g., an authentication token, an authorization token, an IID token, etc.). The computing, based on determining that the information associated with the first application was received from the second application, may request, generate, and/or retrieve the token. The computing device may send/provide the token to the first application.

The first application may receive the token. The first application may use the token to access a resource on the user device. The resource may comprise data, such as material/content (e.g., contact list, calendars, photos, files, etc.) and/or hardware access (e.g., a battery, accelerometers, global positioning hardware, a display, etc.) associated with the user device. The first application, based on receiving the token, may be deemed/considered a verified application installed on the user device.

FIG. 6 shows a flowchart of an example method 600 for verifying applications. At 610, applications may be determined. For example, applications installed on a user device (e.g., a mobile device, a smart device, a communication device, a computing device, the user device 102, etc.) may be determined. To verify a first application installed on and/or associated with the user device, a computing device (e.g., an application management device/service, a server, a cloud device, a service provider, the computing device 104, etc.) may determine a second application installed on the user device. The first application may send a request for verification to the computing device. The request may include an identifier of the user device and/or an identifier of the first application. The identifier of the user device may be, for example, an MDN, an MIN, an IMSI, an IMEI, and the like. The identifier of the first application may be, for example, an IID, an application package identifier, a name of the application, and the like.

The computing device may use the identifier of the user device to determine a user account and/or user profile associated with the user device. The computing device may use the user account and/or user profile associated to determine that the second application is installed on and/or associated with the user device. For example, an identifier of the second application may be on a list of installed applications for the user device. The second application may be a verified application installed on the user device. The second application may be indicated as being configured for verifying other applications. The computing device may determine, based on the identifier of the first application, that the first application is on and/or is associated with a whitelist associated with the user account and/or user profile. The whitelist may be a list of acceptable and/or trustworthy applications.

The computing device may send a notification to the second application. The notification may include a push notification, a wireless access protocol (WAP) push, a SMS message, a binary SMS message, an EMS message, and/or the like. The notification may include a nonce. The notification may cause and/or instruct the second application to determine information associated with the first application. The information associated with the first application may include, but is not limited to, whether the first application is installed on the user device, whether the first application has a valid installation signature, a creation/installation instance (e.g., an installation time, an installation date, etc.) of the first application, and/or any other information associated with the first application. For example, the information associated with the first application may be determined based on querying an application package manager located on the user device.

At 620, information may be received. For example, the information associated with the first application may be received via the second application. The information associated with the first application may be received with an identifier of the second application and/or a hash of the nonce and the identifier of the second application. The second application may send the information associated with the first application, the identifier of the second application, and/or the hash of the nonce and the identifier of the second application to the computing device.

At 630, information may be determined. For example, the information associated with the first application may be determined to have been sent by the second application. The computing device may receive the information associated with the first application, the identifier of the second application, and the hash of the nonce and the identifier of the second application from the second application. The computing device may determine that the information associated with the first application was received from the second application by generating a hash of the nonce and the identifier of the second application. Providing the generated hash matches the received hash, the computing device may verify that the information associated with the first application was received from the second application. The computing device, based on the information associated with the first application, the identifier of the second application, and/or the hash of the nonce and the identifier of the second application, may verify the first application.

At 640, an indication may be sent. The token may be an authentication token, an authorization token, an IID token, and/or the like. The computing device may request, generate, and/or retrieve a token to send (e.g., an authentication token, an authorization token, an IID token, etc.). The computing device may send/provide the token to the first application. The computing device may send the token to the first application to permit the first application to access a resource on the user device. The resource may comprise data, such as material/content (e.g., contact list, calendars, photos, files, etc.) and/or hardware access (e.g., a battery, accelerometers, global positioning hardware, a display, etc.) associated with the user device. The first application may be considered a verified application installed on the user device.

FIG. 7 shows a flowchart of an example method 700 for verifying applications. At 710, a request to verify a first application may be received. For example, a request to verify an application may be received from a user device or a remote server. A computing device (e.g., an application management device/service, a server, a cloud device, a service provider, the computing device 104, etc.) may receive a request for verification from a first application associated with a first user device (e.g., a mobile device, a smart device, a communication device, a computing device, the user device 102, etc.). The request may include an identifier of the first user device and/or an identifier of the first application. The identifier of the first user device may be, for example, an MDN, an MIN, an IMSI, an IMEI, and the like. The identifier of the first application may be, for example, an IID, an application package identifier, a name of the application, and the like.

At 720, a second application installed on a second user device may be determined. The second application may be installed on and/or associated with a second user device that is associated with the first user device. For example, the first user device and the second user device may both be associated with the same user information (e.g., a user account, a user profile, a service account, etc.). The computing device may use the identifier of the first user device to determine a user account and/or user profile associated with the first user device. The computing device may use the user account and/or user profile associated to determine that a second user device is associated with the first user device. The computing device may use the user account and/or user profile to determine that the second application is installed on and/or associated with the second user device. For example, an identifier of the second application may be on a list of installed applications for the second user device. The second application may be a verified application installed on the second user device. The second application may be indicated as being configured for verifying other applications on other user devices. The computing device may determine, based on the identifier of the first application, that the first application is on and/or is associated with a whitelist associated with the user account and/or user profile. The whitelist may be a list of acceptable and/or trustworthy applications.

At 730, a notification may be sent to the second application. The computing device may send a notification to the second application (second user device). The notification may include a push notification, a WAP push, a SMS message, a binary SMS message, an EMS message, and/or the like. The notification may comprise a nonce. The notification may cause and/or instruct the second application to determine information associated with the first application and/or first user device. To determine information associated with the first application and/or first user device, the second user device may communicate with the first user device via a long-range communication technique (e.g., Internet, cellular, satellite, and the like), via a short-range communication technique (e.g., BLUETOOTH®, ZigBee, Z-wave, near-field communication, infrared, etc.), and/or via any communication technique. The notification may cause the second application on the second user device to determine whether the first application is installed on the first user device, determine if the first application has a valid installation signature, determine a creation/installation instance (e.g., an installation time, an installation date, etc.) of the first application, and/or the like. For example, the information associated with the first application may be determined based on querying, or causing the querying of, an application package manager located on the first user device.

At 740, information may be received. For example, the information associated with the first application may be received. The information associated with the first application may be received by the second application on the second user device and/or by the computing device. In addition, an identifier (e.g., an IID, an application package identifier, etc.) of the second application and/or a hash of the nonce and the identifier of the second application may be received. The information associated with the first application, the identifier of the second application, and/or the hash of the nonce and the identifier of the second application may be received by the computing device from the second application and/or the first application.

The computing device may determine that the information associated with the first application was received from the second application by generating a hash of the nonce and the identifier of the second application. Providing the generated hash matches the received hash, the computing device may verify that the information associated with the first application was received from the second application.

The computing device, based on one or more of the information associated with the first application, the identifier of the second application, or any other information may verify the first application. The computing device may request, generate, and/or retrieve a token (e.g., an authentication token, an authorization token, an IID token, etc.). The computing device may send/provide the token to the first application. The first application may use the token to access material/content (e.g., contact list, calendars, photos, files, etc.) and/or resources (e.g., a battery, accelerometers, global positioning hardware, a display, etc.) associated with the first user device. The first application, based on receiving the token, may be deemed/considered a verified application installed on the first user device.

FIG. 8 shows a flowchart of an example method 800 for verifying applications. At 810, one or more applications associated with a user device (e.g., a mobile device, a smart device, a communication device, a computing device, the user device 102, etc.) may be determined (e.g., identified). For example, a computing device (e.g., an application management device/service, a server, a cloud device, a service provider, the computing device 104, etc.) may determine the one or more applications associated with the user device. In some instances, the user device (e.g., an operating system and/or application associated with the user device, etc.) may determine the one or more applications associated with the user device. In some instances, the computing device may receive a request to verify an application, such as a first application associated with a user device. The request can be received by any means. The request may include an identifier of the user device and/or an identifier of the first application. The identifier of the user device may be, for example, an MDN, an MIN, an IMSI, an IMEI, and/or the like. The identifier of the first application may be, for example, an IID, an application package identifier, a name of the application, and/or the like. The identifier of the first application may be any identifier associated with the user device and/or the first application.

The computing device may determine a second application, such as a second application associated with the user device. In some instances, the user device (e.g., an operating system and/or application associated with the user device, etc.) may determine the second application. The second application can be determined by any means. For example, the computing device may use the identifier of the user device to determine the second application. The computing device may use the identifier of the user device to determine a user account and/or user profile associated with the user device. The computing device may use the user account and/or user profile to determine that the second application is installed on and/or associated with the user device. For example, an identifier of the second application may be on a list of installed applications for the user device. The second application may be a verified application installed on the user device. The second application may be indicated as being configured for verifying other applications. In some instances, the computing device may determine, based on the identifier of the first application, whether the first application is on and/or is associated with a whitelist associated with the user account and/or user profile. The whitelist may be a list of acceptable and/or trustworthy applications. In some instances, the computing device may determine that the first application is not on and/or is not associated with the whitelist. The computing device, based on determining that the first application is not on and/or is not associated with the whitelist, may cause the first application to uninstall and/or deactivate. In some instances, the computing device may determine that the first application is on and/or is associated with the whitelist, and thus may be verified as being installed and/or associated with the user device.

At 820, a notification may be sent to the second application. The notification may be sent by any means. For example, the computing device may send the notification to the second application. In some instances, the user device (e.g., an operating system and/or application associated with the user device, etc.) may send the notification to the second application. The notification may include a push notification, a WAP push, a SMS message, a binary SMS message, an EMS message, and/or the like. The notification may cause and/or instruct the second application to determine information associated with the first application. In some instances, the notification may include a nonce. The information associated with the first application may include, but is not limited to, whether the first application is installed on the user device, whether the first application has a valid installation signature, a creation/installation instance (e.g., an installation time, an installation date, etc.) of the first application, and/or any other information associated with the first application. For example, the information associated with the first application may be determined based on querying an application package manager located on the user device. In some instances, information associated with the second application may be determined. Information associated with the second application may include an identifier (e.g., an IID, an application package identifier, etc.) of the second application, a hash of the nonce and the identifier of the second application, a valid installation signature associated with the second application, a creation/installation instance (e.g., an installation time, an installation date, etc.) of the second application, and/or any other information associated with the second application. xxx At 830, information may be received. Information may be received by any means. For example, the information associated with the first application may be received. The computing device may receive the information associated with the first application. In some instances, the computing device may receive the information associated with the first application and/or the information associated with the second application, from the second application.

At 840, the computing device may verify the first application. In some instances, the computing device, may use the information associated with the first application to verify the first application. In some instances, the computing device may use the information associated with the first application to determine whether the first application is on and/or is associated with a whitelist (or any other data/information) associated with a user account and/or user profile. The whitelist may be a list of acceptable and/or trustworthy applications. In some instances, the computing device may determine that the first application is not on and/or is not associated with the whitelist. The computing device, based on determining that the first application is not on and/or is not associated with the whitelist, may cause the first application to uninstall and/or deactivate. In some instances, the computing device may determine that the first application is on and/or is associated with the whitelist, and thus may be further verified as being installed and/or associated with the first user device.

In some instances, the computing device, may verify the first application based on receiving the information associated with the first application from the second application. In some instances, the computing device, may use the information associated with the first application, the identifier of the second application, and/or the hash of the nonce and the identifier of the second application, to verify the first application. In some instances, the computing device may determine that the information associated with the first application was received from the second application by generating a hash of the nonce and the identifier of the second application. When the generated hash matches the received hash, the computing device may verify that the information associated with the first application was received from the second application. The computing device may verify the first application based on verifying that the information associated with the first application was received from the second application.

At 850, access information may be sent to the first application. The computing device may send the access information to the first application. In some instances, the computing device may send the access information to the second application, and the second application may send the access information to the first application. The access information may be and/or include a token and/or any other information/data associated with accessing a resource, device, and/or the like. In some instances, the computing device may request, generate, and/or retrieve a token (e.g., an authentication token, an authorization token, an IID token, etc.). The computing device may send/provide the token to the first application. The first application may use the token to access material/content (e.g., contact list, calendars, photos, files, etc.) and/or resources (e.g., a battery, accelerometers, global positioning hardware, a display, etc.) associated with the user device. The first application, based on receiving the access information, may be considered a verified application installed on the user device.

Figure 9:
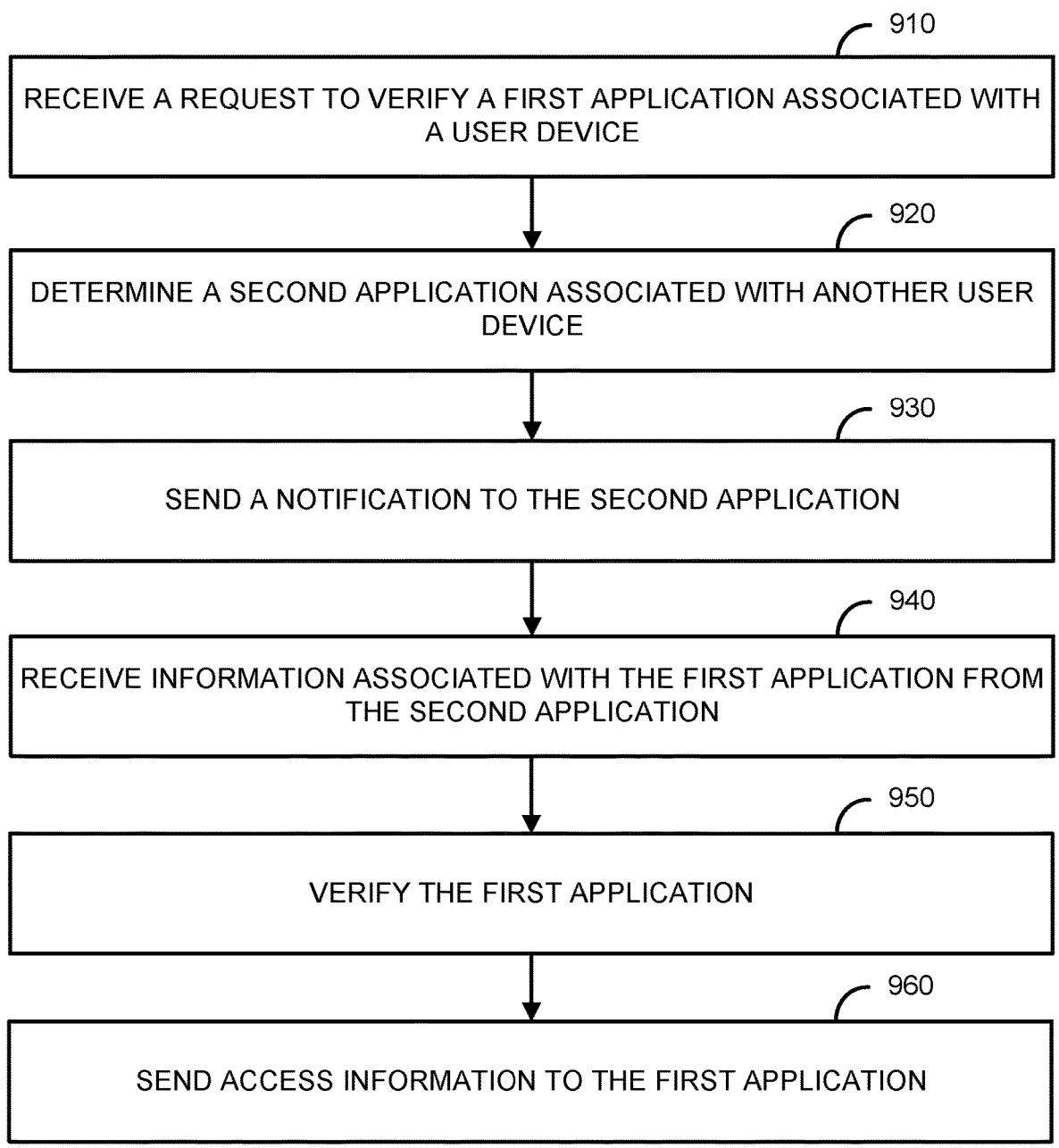
FIG. 9 shows an example flowchart of a method for verifying applications.

FIG. 9 shows a flowchart of an example method 900 for verifying one or more applications. At 910, one or more applications associated with one or more user devices (e.g., mobile devices, smart devices, communication devices, computing devices, the user device 102, etc.) may be determined. A computing device (e.g., an application management device/service, a server, a cloud device, a service provider, the computing device 104, etc.) may determine applications associated with a first user device and/or a second user device. For example, the computing device may receive a request to verify an application, such as a first application associated with the first user device. The request can be received by any means. The request may include an identifier of the first user device and/or an identifier of the first application. The identifier of the first user device may be, for example, an MDN, an MIN, an IMSI, an IMEI, and/or the like. The identifier of the first application may be, for example, an IID, an application package identifier, a name of the application, and/or the like. The identifier of the first application may be any identifier associated with the first user device and/or the first application. In some instances, the computing device may determine, based on the identifier of the first application, whether the first application is on and/or is associated with a whitelist associated with a user account and/or user profile. The whitelist may be a list of acceptable and/or trustworthy applications. In some instances, the computing device may determine that the first application is not on and/or is not associated with the whitelist. The computing device, based on determining that the first application is not on and/or is not associated with the whitelist, may cause the first application to uninstall and/or deactivate. In some instances, the computing device may determine that the first application is on and/or is associated with the whitelist. The computing device, based on determining that the first application is on and/or is associated with the whitelist may further verify the first application as being installed and/or associated with the first user device.

At 920, a second application may be determined. The computing device may determine the second application. The second application may be associated with the second user device. The second application can be determined by any means. For example, the computing device may use the identifier of the first user device to determine the second user device and/or the second application. In some instances, the computing device may use the identifier of the user device to determine a user account and/or user profile associated with the first user device. The computing device may use the user account and/or user profile associated with the first user device to determine the second user device and/or the second application. The computing device may use the user account and/or user profile associated with the first user device to determine that the second application is installed on and/or associated with the second user device. For example, an identifier of the second user device and/or the second application may be on a list of applications associated with the user account and/or user profile. The second application may be a verified application installed on the second user device. The second user device and/or the second application may be indicated as being configured for verifying other applications.

At 930, a notification may be sent to the second user device and/or the second application. The notification may be sent by any means. For example, the computing device may send the notification to the second user device and/or the second application. The notification may include a push notification, a WAP push, a SMS message, a binary SMS message, an EMS message, and/or the like. The notification may cause and/or instruct the second application to determine information associated with the first application. In some instances, the notification may include a nonce.

The notification may cause the second user device and/or the second application to communicate with the first user device and/or first application. The second user device and/or the second application can communicate with the first user device and/or first application via a long-range communication technique (e.g., Internet, cellular, satellite, and the like), via a short-range communication technique (e.g., BLUETOOTH®, ZigBee, Z-wave, near-field communication, infrared, etc.), and/or via any communication technique. The second user device and/or the second application may request information associated with the first application from the first application and/or the first user device. The information associated with the first application may include, but is not limited to, whether the first application is installed on the first user device, whether the first application has a valid installation signature, a creation/installation instance (e.g., an installation time, an installation date, etc.) of the first application, and/or any other information associated with the first application and/or the first user device. For example, the second user device and/or the second application may determine the information associated with the first application by querying and/or communicating with an application package manager and/or operating system located on and/or associated with the first user device.

In some instances, information associated with the second application may be determined. The second user device and/or the second application may determine the information associated with the second application. The information associated with the second application may include an identifier (e.g., an IID, an application package identifier, etc.) of the second application, a hash of the nonce and the identifier of the second application, a valid installation signature associated with the second application, a creation/installation instance (e.g., an installation time, an installation date, etc.) of the second application, and/or any other information associated with the second application.

At 940, information may be received. Information may be received by any means. For example, the information associated with the first application may be received. In some instances, the information associated with the second application may be received. The computing device may receive the information associated with the first application and/or the information associated with the second application. The computing device may receive the information associated with the first application and/or the information associated with the second application from the second application and/or the second user device.

At 950, the computing device may verify the first application. In some instances, the computing device, may use the information associated with the first application to verify the first application. In some instances, the computing device, may verify the first application based on receiving the information associated with the first application from the second application and/or the second user device. In some instances, the computing device, may verify the first application based on receiving the information associated with the first application and the information associated with the second application from the second application and/or the second user device. In some instances, the computing device, may use the information associated with the first application and the information associated with the second application, such as the identifier of the second application, and/or the hash of the nonce and the identifier of the second application, to verify the first application. In some instances, the computing device may determine that the information associated with the first application was received from the second application and/or the second user device by generating a hash of the nonce and the identifier of the second application. When the generated hash matches the received hash, the computing device may verify that the information associated with the first application was received from the second application and/or the second user device. When the computing device may verify that the information associated with the first application was received from the second application and/or the second user device, the computing device may verify the first application.

At 960, access information may be sent to the first application. The computing device may send the access information to the first application. In some instances, the computing device may send the access information to the second application, and the second application may send the access information to the first application. The access information may be and/or include a token and/or any other information/data associated with accessing a resource, device, and/or the like. In some instances, the computing device may request, generate, and/or retrieve a token (e.g., an authentication token, an authorization token, an IID token, etc.). The computing device may send/provide the token to the first application. The first application may use the token to access material/content (e.g., contact list, calendars, photos, files, etc.) and/or resources (e.g., a battery, accelerometers, global positioning hardware, a display, etc.) associated with the first user device. The first application, based on receiving the access information, may be considered a verified application installed on and/or associated with the first user device.

Figure 10:
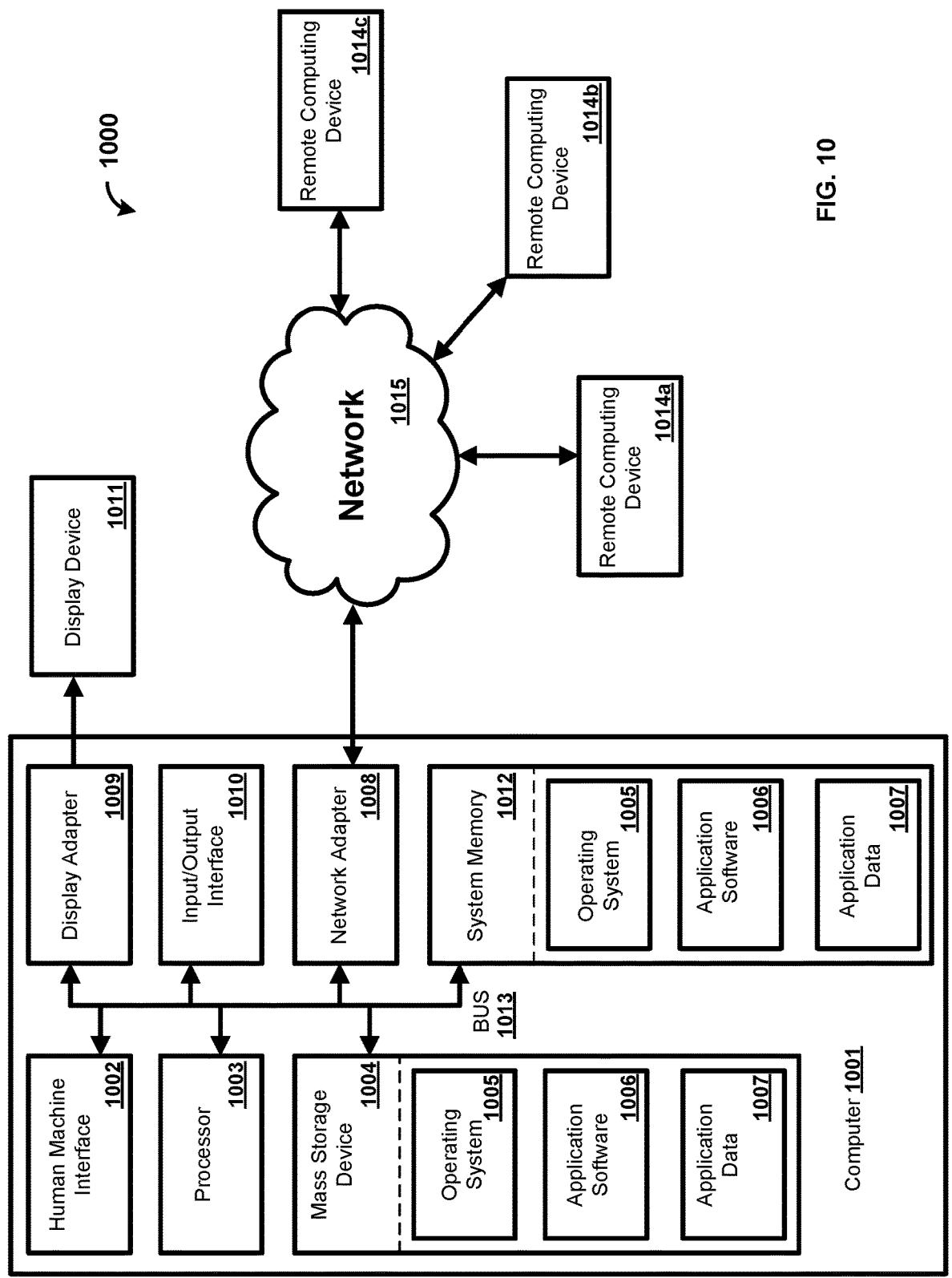
FIG. 10 shows a block diagram of an example computing device for implementing verification of applications.

FIG. 10 shows an example system 1000 for verifying applications. Any device described herein may be a computer 1001 as shown in FIG. 10. The computer 1001 may comprise one or more processors 1003, a system memory 1012, and a bus 1013 that couples various components of the computer 1001 including the one or more processors 1003 to the system memory 1012. In the case of multiple processors 1003, the computer 1001 may utilize parallel computing.

The bus 1013 may comprise one or more of several possible types of bus structures, such as a memory bus, memory controller, a peripheral bus, an accelerated graphics port, and a processor or local bus using any of a variety of bus architectures.

The computer 1001 may operate on and/or comprise a variety of computer readable media (e.g., non-transitory). Computer readable media may be any available media that is accessible by the computer 1001 and comprises, non-transitory, volatile and/or non-volatile media, removable and non-removable media. The system memory 1012 has computer readable media in the form of volatile memory, such as random access memory (RAM), and/or non-volatile memory, such as read only memory (ROM). The system memory 1012 may store data/information such as application data 1007 and/or program modules such as operating system 1005 and application software 1006 that are accessible to and/or are operated on by the one or more processors 1003.

The computer 1001 may also comprise other removable/non-removable, volatile/non-volatile computer storage media. The mass storage device 1004 may provide non-volatile storage of computer code, computer readable instructions, data/information structures, program modules, and other data/information for the computer 1001. The mass storage device 1004 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 1004. An operating system 1005 and application software 1006 may be stored on the mass storage device 1004. One or more of the operating system 1005 and application software 1006 (or some combination thereof) may comprise program modules and the application software 1006. Application data 1007 may also be stored on the mass storage device 1004. Application data 1007 may be stored in any of one or more databases known in the art. The databases may be centralized or distributed across multiple locations within the network 1015.

A user may enter commands and information into the computer 1001 via an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 1003 via a human machine interface 1002 that is coupled to the bus 1013, but may be connected by other interface and bus structures, such as a parallel port, game port, an IEEE 1394 Port (also known as a Firewire port), a serial port, network adapter 1008, and/or a universal serial bus (USB).

A display device 1011 may also be connected to the bus 1013 via an interface, such as a display adapter 1009. It is contemplated that the computer 1001 may have more than one display adapter 1009 and the computer 1001 may have more than one display device 1011. A display device 1011 may be a monitor, an LCD (Liquid Crystal Display), light emitting diode (LED) display, television, smart lens, smart glass, and/or a projector. In addition to the display device 1011, other output peripheral devices may comprise components such as speakers (not shown) and a printer (not shown) which may be connected to the computer 1001 via Input/Output Interface 1010. Any step and/or result of the methods may be output (or caused to be output) in any form to an output device. Such output may be any form of visual representation, including, but not limited to, textual, graphical, animation, audio, tactile, and the like. The display 1011 and computer 1001 may be part of one device, or separate devices.

The computer 1001 may operate in a networked environment using logical connections to one or more remote computing devices 1014a,b,c. A remote computing device 1014a,b,c may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 1001 and a remote computing device 1014a,b,c may be made via a network 1015, such as a local area network (LAN) and/or a general wide area network (WAN). Such network connections may be through a network adapter 1008. A network adapter 1008 may be implemented in both wired and wireless environments. Such networking environments are conventional and commonplace in dwellings, offices, enterprise-wide computer networks, intranets, and the Internet.

Application programs and other executable program components such as the operating system 1005 are shown herein as discrete blocks, although it is recognized that such programs and components may reside at various times in different storage components of the computing device 1001, and are executed by the one or more processors 1003 of the computer 1001. An implementation of application software 1006 may be stored on or sent across some form of computer readable media. Any of the disclosed methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
    determining, based on a request for verification of a first application associated with a user device, a second application associated with the user device;
    sending, to the second application, a notification that causes the second application to determine information associated with the first application;
    receiving, from the second application, the information associated with the first application;
    verifying, based on the information associated with the first application, the first application; and
    sending, to the first application based on verifying the first application, access information, wherein the access information enables the first application to access a resource.

2. The method of claim 1, wherein the request for verification comprises an instance identifier (IID) associated with the first application, wherein the method further comprises determining, based on the IID, that the first application is associated with a whitelist, wherein the whitelist comprises verified applications.

3. The method of claim 1, wherein the request for verification comprises an instance identifier (IID) associated with the first application, wherein the method further comprises:
    determining, based on the IID, that the first application is not associated with a whitelist; and
    causing, based on determining that the first application is not associated with the whitelist, one or more of uninstallation or deactivation of the first application.

4. The method of claim 1, wherein the identifier of the user device comprises one or more of a mobile directory number (MDN), a mobile identification number (MIN), an international mobile subscriber identity (IMSI), or an international mobile equipment identifier (IMEI).

5. The method of claim 1, wherein the second application is verified, wherein determining the second application comprises:
    determining one or more of a user profile, or a user account; and
    determining, based on one or more of the user profile, or the user account, the second application.

6. The method of claim 1, wherein the notification comprises one or more of a push notification, a wireless access protocol (WAP) push message, a short message service (SMS) message, a binary SMS message, or an enhanced message service (EMS) message.

7. The method of claim 1, wherein the information associated with the first application comprises one or more of a valid installation signature, an installation date, an installation time, or an application package identifier.

8. The method of claim 1, wherein receiving the information associated with the first application comprises receiving information associated with the second application, wherein the information associated with the second application comprises an instance identifier (IID) associated with the second application.

9. The method of claim 1, wherein the request comprises an identifier of the user device, wherein the information associated with the first application indicates that the first application is installed on one or more of the user device or another user device associated with the user device.

10. A method comprising:
  receiving a request to verify a first application associated with a user device, wherein the request comprises an identifier of the user device;
  determining, based on the identifier of the user device, a second application associated with another user device;
  sending, to the second application, a notification that causes the second application to determine information associated with the first application;
  receiving, from the second application, the information associated with the first application;
  verifying, based on the information associated with the first application, the first application; and
  sending, to the first application based on verifying the first application, access information, wherein the access information enables the first application to access a resource.

11. The method of claim 10, wherein the request to verify the first application comprises an instance identifier (IID) associated with the first application, wherein the method further comprises determining, based on the IID, that the first application is associated with a whitelist, wherein the whitelist comprises a list of verified applications.

12. The method of claim 10, wherein the notification causes the second application to communicate with the first application, wherein the information associated with the first application comprises one or more of a valid installation signature, an installation date, an installation time, or an application package identifier.

13. The method of claim 10, wherein the identifier of the user device comprises one or more of a mobile directory number (MDN), a mobile identification number (MIN), an international mobile subscriber identity (IMSI), or an international mobile equipment identifier (IMEI).

14. The method of claim 10, wherein the notification comprises one or more of a push notification, a wireless access protocol (WAP) push, a short message service (SMS) message, a binary SMS message, or an enhanced message service (EMS) message.

15. The method of claim 10, wherein the information associated with the first application comprises one or more of a valid installation signature, an installation date, an installation time, or an application package identifier.

16. The method of claim 10, wherein receiving the information associated with the first application comprises receiving information associated with the second application, wherein the information associated with the second application comprises an instance identifier (IID) associated with the second application.

17. The method of claim 10, wherein the resource comprises data stored on a user device, wherein the access information comprises a token.

18. A method comprising:
  determining, based on a request for verification of a first application associated with a user device, a second application associated with the user device;
  sending, to the second application, a notification that causes the second application to determine information associated with the first application;
  receiving, from the second application, the information associated with the first application and information associated with the second application;
  verifying, based on the information associated with the first application and the information associated with the second application, the first application; and
  sending, to the first application based on verifying the first application, access information, wherein the access information enables the first application to access a resource.

19. The method of claim 18, wherein the second application is verified, wherein the information associated with the second application comprises an instance identifier (IID) associated with the second application.

20. The method of claim 18, wherein the notification comprises one or more of a push notification, a wireless access protocol (WAP) push, a short message service (SMS) message, a binary SMS message, or an enhanced message service (EMS) message.

* * * * *